(12) United States Patent
Vaughan-Chaldy

(10) Patent No.: US 7,922,186 B2
(45) Date of Patent: Apr. 12, 2011

(54) MOTORCYCLE FLOORBOARD MOUNTING SYSTEM AND APPARATUS

(75) Inventor: John Vaughan-Chaldy, Fallbrook, CA (US)

(73) Assignee: Baron Custom Accessories, Fallbrook, CA (US)

( * ) Notice: Subject to any disclaimer, the term of this patent is extended or adjusted under 35 U.S.C. 154(b) by 198 days.

(21) Appl. No.: 12/152,250

(22) Filed: May 13, 2008

(65) Prior Publication Data

US 2009/0285628 A1   Nov. 19, 2009

(51) Int. Cl.
B62J 25/00 (2006.01)
(52) U.S. Cl. .................... 280/291; 403/24; 403/408.1
(58) Field of Classification Search .......... 403/3, 4, 403/187, 188, 205, 231, 262, 286, 292, 408.1; 280/163, 164.1, 291; 74/564; 248/220.21, 248/220.22, 224.8, 300
See application file for complete search history.

(56) References Cited

U.S. PATENT DOCUMENTS

| | | | | |
|---|---|---|---|---|
| 3,415,554 A * | 12/1968 | Papayoti | ........................ | 403/187 |
| 3,899,972 A * | 8/1975 | Albright | ..................... | 101/415.1 |
| 4,174,852 A * | 11/1979 | Panzica et al. | ................. | 280/291 |
| 4,546,993 A | 10/1985 | Walker | | |
| 4,779,481 A * | 10/1988 | Natzke et al. | .................... | 74/512 |
| 4,802,684 A | 2/1989 | Bennett et al. | | |
| 5,720,359 A | 2/1998 | Attenello | | |
| 6,217,050 B1 * | 4/2001 | Dickie et al. | .................. | 280/291 |
| 6,339,972 B1 | 1/2002 | Paris | | |
| 6,364,561 B1 * | 4/2002 | Droegemueller | .................. | 403/4 |
| 6,481,080 B2 * | 11/2002 | Monson | ........................ | 29/401.1 |
| 6,578,939 B1 * | 6/2003 | Mayer | ........................ | 312/334.5 |
| 6,597,851 B2 * | 7/2003 | Johnson et al. | ................ | 385/131 |
| 6,688,628 B2 | 2/2004 | Burkett | | |
| 6,688,629 B2 * | 2/2004 | Essinger | ........................ | 280/291 |
| 6,691,964 B1 * | 2/2004 | Schaefer | ........................ | 248/250 |
| 6,719,316 B1 | 4/2004 | Anthony | | |
| 7,025,369 B1 | 4/2006 | Sine | | |
| 7,040,442 B2 | 5/2006 | McWhorter | | |
| 7,083,181 B2 | 8/2006 | Lindby | | |
| 7,083,808 B2 | 8/2006 | Goldenheim et al. | | |
| 7,104,157 B1 | 9/2006 | Hilliard | | |
| 7,108,273 B2 | 9/2006 | Hunwardsen | | |
| 7,114,739 B2 | 10/2006 | Colano | | |
| 7,264,255 B1 | 9/2007 | Winfrey | | |
| 7,287,773 B1 * | 10/2007 | Stahel et al. | ................... | 280/291 |
| 7,637,523 B2 * | 12/2009 | Fouhy | ........................... | 280/291 |
| 2005/0247505 A1 | 11/2005 | Nagle | | |
| 2006/0181054 A1 | 8/2006 | Colano | | |
| 2007/0063479 A1 | 3/2007 | Fouhy | | |

* cited by examiner

Primary Examiner — Michael P Ferguson
Assistant Examiner — Nahid Amiri

(57) ABSTRACT

A coupler for removeably attaching a motorcycle foot platform to a motorcycle is provided. The coupler includes a mounting surface that is positionable directly adjacent to the motorcycle and a coupling surface located opposite the mounting surface. The coupling surface includes a first pin bore that is offset from a longitudinal axis of the coupler, and the first pin bore is sized to receive a motorcycle foot platform pin. The coupler also includes a mounting aperture extending through the coupler, the mounting aperture sized to receive a fastener that removeably couples the coupler to the motorcycle, and a foot platform aperture that extends through the coupler, the foot platform aperture located adjacent to the pin bore, and sized to receive a fastener that removeably couples the motorcycle foot platform to the coupler.

14 Claims, 9 Drawing Sheets

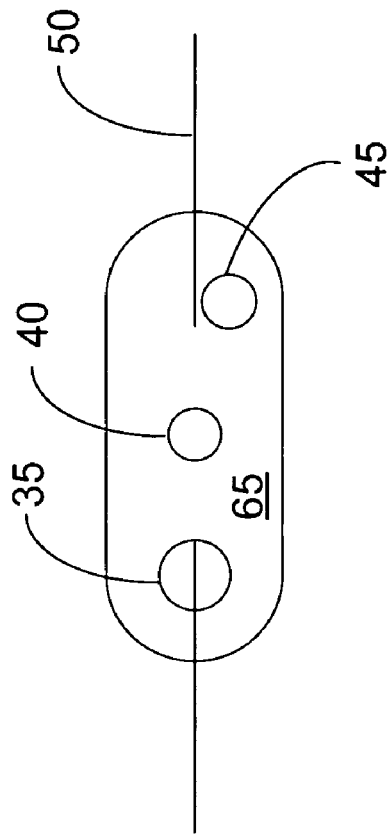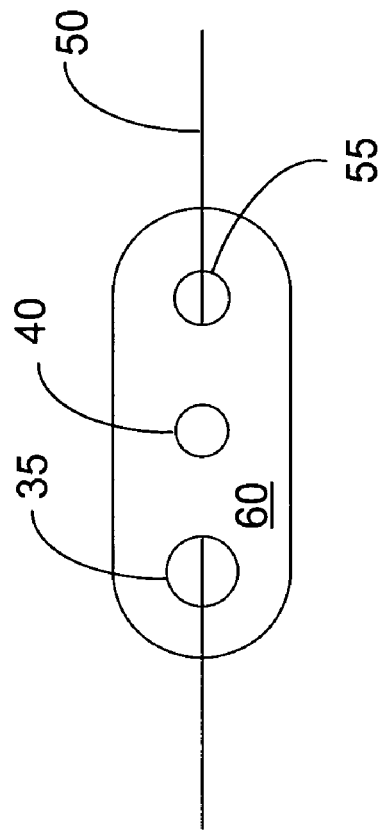

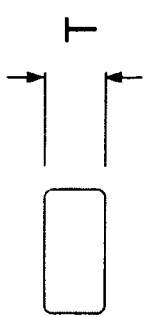
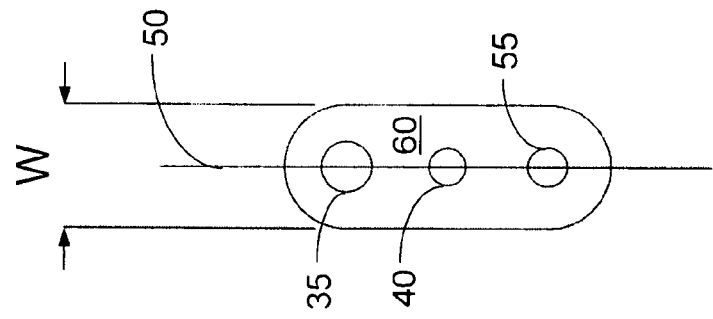
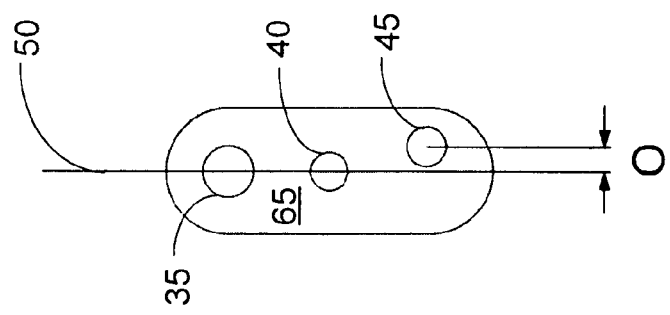

MOTORCYCLE FLOORBOARD MOUNTING SYSTEM AND APPARATUS

FIELD OF THE INVENTION

The present invention generally relates to motorcycles. More particularly, the invention concerns a motorcycle floorboard mounting system and apparatus.

BACKGROUND OF THE INVENTION

The popularity of motorcycling continues to increase. Riders are attracted to the freedom of the open road, leaving behind the cares and worries of everyday life. Motorcycle manufacturers have seized upon the recent surge in popularity and have been selling motorcycles and accessories in record numbers.

One targeted group of consumers are "baby boomers" who now are in their 40's and 50's, and thus have the disposable income to splurge on a new toy for the garage. However, these ageing "boomers" demand their comforts. So, motorcycle dealers, and after-market shops are catering to the boomers by installing soft comfortable seats, large fairings to block the wind, and other items that increase riding comfort.

One common complaint among motorcycle passengers is that the riding position for the "backseater" is uncomfortable. This is because the motorcycle floorboards, also known as footrests, are not suitably positioned. That is, the backseat riding position is determined by the seat and the floorboards, and their relative locations.

Unfortunately, the floorboards, or footrests are placed at a generic location preselected during the manufacturing process and, as such, are located irrespective of the needs of a particular passenger. Thus, they cannot take into account relative leg length differences that exist within the general population.

Therefore, there exists a need for a system an apparatus for mounting a motorcycle footrest that eliminates the above described problems.

BRIEF DESCRIPTION OF THE DRAWINGS

Various embodiments of the present invention taught herein are illustrated by way of example, and not by way of limitation, in the figures of the accompanying drawings, in which:

FIG. 4A is an elevation view of one side of the embodiment of the motorcycle floorboard adjuster illustrated in FIGS. 2 and 3;

FIG. 4B is an elevation view of the other side of the embodiment of the motorcycle floorboard adjuster illustrated in FIG. 4A;

FIGS. 9A-C illustrate the motorcycle floorboard adjuster show in FIGS. 4A-B and 5A-B.

Figure 1:
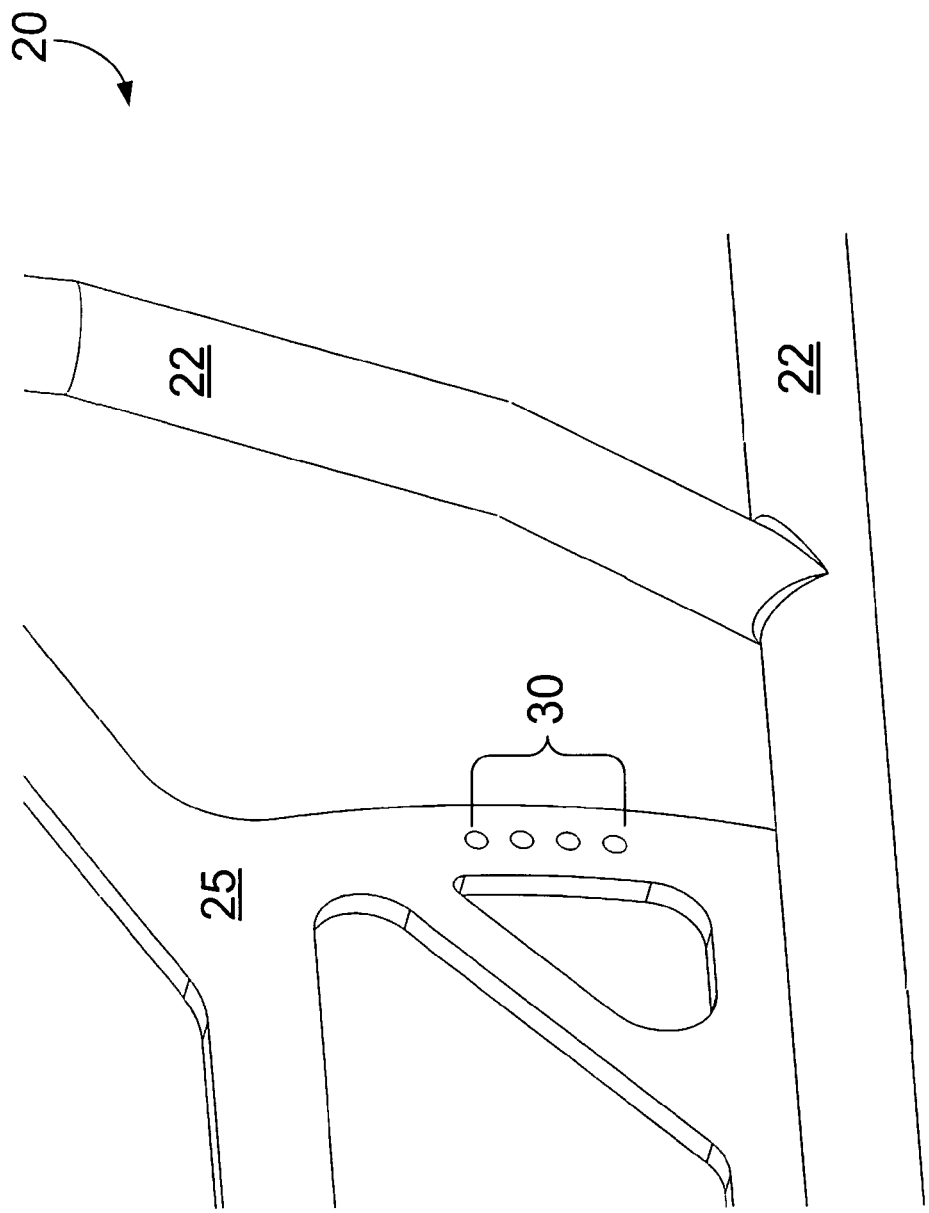
FIG. 1 is an elevation view of a portion of a motorcycle showing a portion of a motorcycle frame and a portion of a motorcycle exhaust.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF EMBODIMENTS OF THE INVENTION

In the following paragraphs, the present invention, in the form of a motorcycle floorboard coupler, or adjuster ("MFA") will be described in detail by way of example with reference to the attached drawings. While the MFA is capable of embodiment in many different forms, there is shown in the drawings and will herein be described in detail specific embodiments, with the understanding that the present disclosure is to be considered as an example of the principles of the MFA and not intended to limit the MFA to the specific embodiments shown and described. That is, throughout this description, the embodiments and examples shown should be considered as exemplars, rather than as limitations on the MFA. Descriptions of well known components, methods and/or processing techniques are omitted so as to not unnecessarily obscure the invention. As used herein, the "MFA" refers to any one of the embodiments described herein, and any equivalents. Furthermore, reference to various feature(s) of the "MFA" throughout this document does not mean that all claimed embodiments or methods must include the referenced feature(s).

Motorcycles have been in production for over 100 years, built by manufacturers such as Aprilla, BMW, Buell, Ducati, Harley-Davidson, Honda, Indian, Kawasaki, Moto Guzzi, Suzuki, Triumph, Victory, Yamaha, and others. It will be appreciated that the MFA described herein may be installed on any motorcycle built by the above-listed manufacturers, or other un-named manufacturers (some, or all of the above-listed manufacturer names may be registered trademarks of their respective owners).

One manufacturer that has become very popular in the United States, as well as through-out the world, is Harley-Davidson. Harley-Davidson manufactures many different models of motorcycles, which may be generally categorized into five different types: Touring models, Softail models, Sportster models, Dyna Glide models, and V-Rod models (Harley-Davidson is a registered trademark of H-D Michigan, Inc., of Ann Arbor Mich.).

For example, touring models may include the FLHT Electra Glide standard, FLHTC Electra Glide classic, FLHTCU Ultra Classic Electra Glide, FLHTP Electra Glide police, FLHS Electra Glide sport, FLHR Road King, FLHRC Road King classic, FLHP Road King police, FLTC Tour Glide classic, FLTCU Ultra classic tour Glide, FLTR Road Glide, FLHRS Road King custom, FLHRI Road King, FLHRSI Road King custom, FLHRCI Road King classic, FLTRI Road Glide, FLHTI Electra Glide standard, FLHTCI Electra Glide classic, the FLHTCUI Ultra Classic Electra Glide, and other models (some or all of the above model names may be registered trademarks of H-D Michigan, Inc., of Ann Arbor Mich.).

Sportster models may include the Sportster XL883, Sportster XL883L, Sportster XL883C, Sportster XL883C custom, Sportster XL883R, Sportster XLH883, Sportster XLH883 Hugger, Sportster XLH883 Deluxe, Sportster XL1200C, Sportster XL1200C custom, Sportster XL1200R, Sportster XL1200R Roadster, Sportster XLH1200, the Sportster 1200S Sport, and other models (some or all of the above model names may be registered trademarks of H-D Michigan, Inc., of Ann Arbor Mich.).

Dyna Glide models may include the FXD Dyna Super Glide, FXDX Dyna Super Glide sport, FXDXT Dyna Super Glide T-sport, FXDL Dyna Low Rider, FXDP Dyna Defender, FXDS-CONV Dyna Convertible, FXDWG Dyna Wide Glide, FXDC/I Super Glide Custom, FXDI Dyna Super Glide, FXDXI Dyna Super Glide sport, FXDCI Super Glide custom, FXDLI Dyna Low Rider, the FXDWGI Dyna Wide Glide, and other models (some or all of the above model names may be registered trademarks of H-D Michigan, Inc., of Ann Arbor Mich.).

V-Rod models may include the VRSCA V-Rod, VRSCB V-Rod, the VRSCR Street Rod, and other models (some or all of the above model names may be registered trademarks of H-D Michigan, Inc., of Ann Arbor Mich.).

Softail models may include the FXST Softail Standard, FXSTI Softail Standard, FXSTB Night Train, FXSTBI Night Train, FXSTSI Springer Softail, FXSTDI Deuce, FLSTF Fat Boy, FLSTFI Fat Boy, FLSTFI Fat Boy 15$^{th}$ Anniversary Special Edition, FLSTNI Softail Deluxe, FLSTSCI Softail Springer Classic, FLSTC Heritage Softail Classic, FLSTCI Heritage Softail Classic, FLSTN Heritage Softail Special, FLSTS Heritage Springer, FXSTC Softail Custom, FXSTD Softail Deuce, FXSTS Springer Softail, the FXSTSB Bad Boy, and other models (some or all of the above model names may be registered trademarks of H-D Michigan, Inc., of Ann Arbor Mich.).

Clearly, Harley-Davidson manufactures many different motorcycle models. It will be appreciated that the MFA may be installed on any of the above-listed models, or on other models yet to be manufactured. In addition, the MFA may be installed on a "custom" motorcycle, which is a motorcycle that differs from a manufacturer-produced model. For example, a custom motorcycle may be a Harley-Davidson FXST Softail Standard that has had specific parts either added, removed or modified. Or, a custom motorcycle may be built from scratch, using no, or very few pre-manufactured parts, such as only the engine, transmission and tires.

Figure 6:
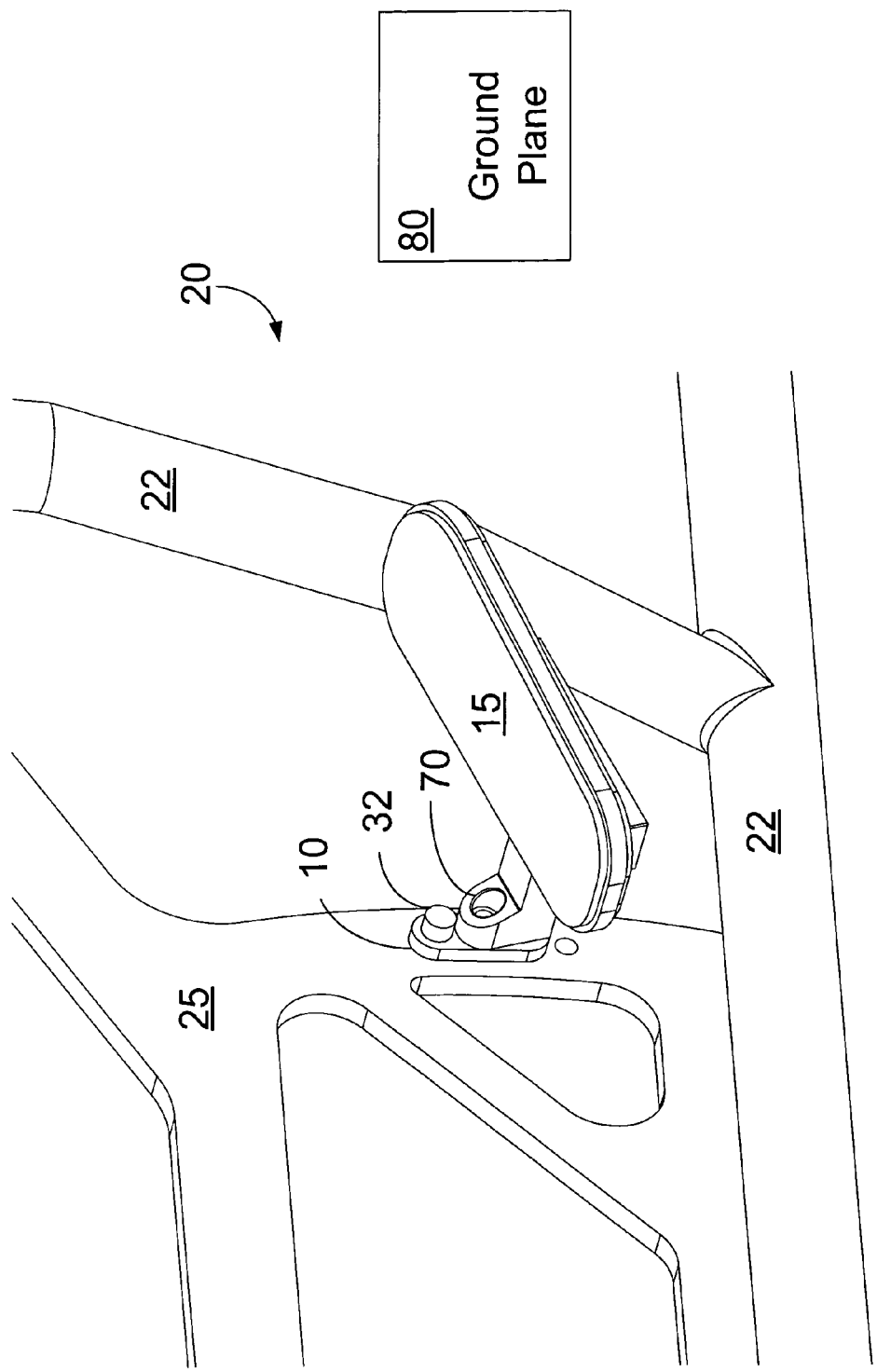
FIG. 6 is a perspective view of the motorcycle floorboard adjuster, the portion of the motorcycle illustrated in FIG. 2, and a motorcycle floorboard in a substantially angled position.
Figure 7:
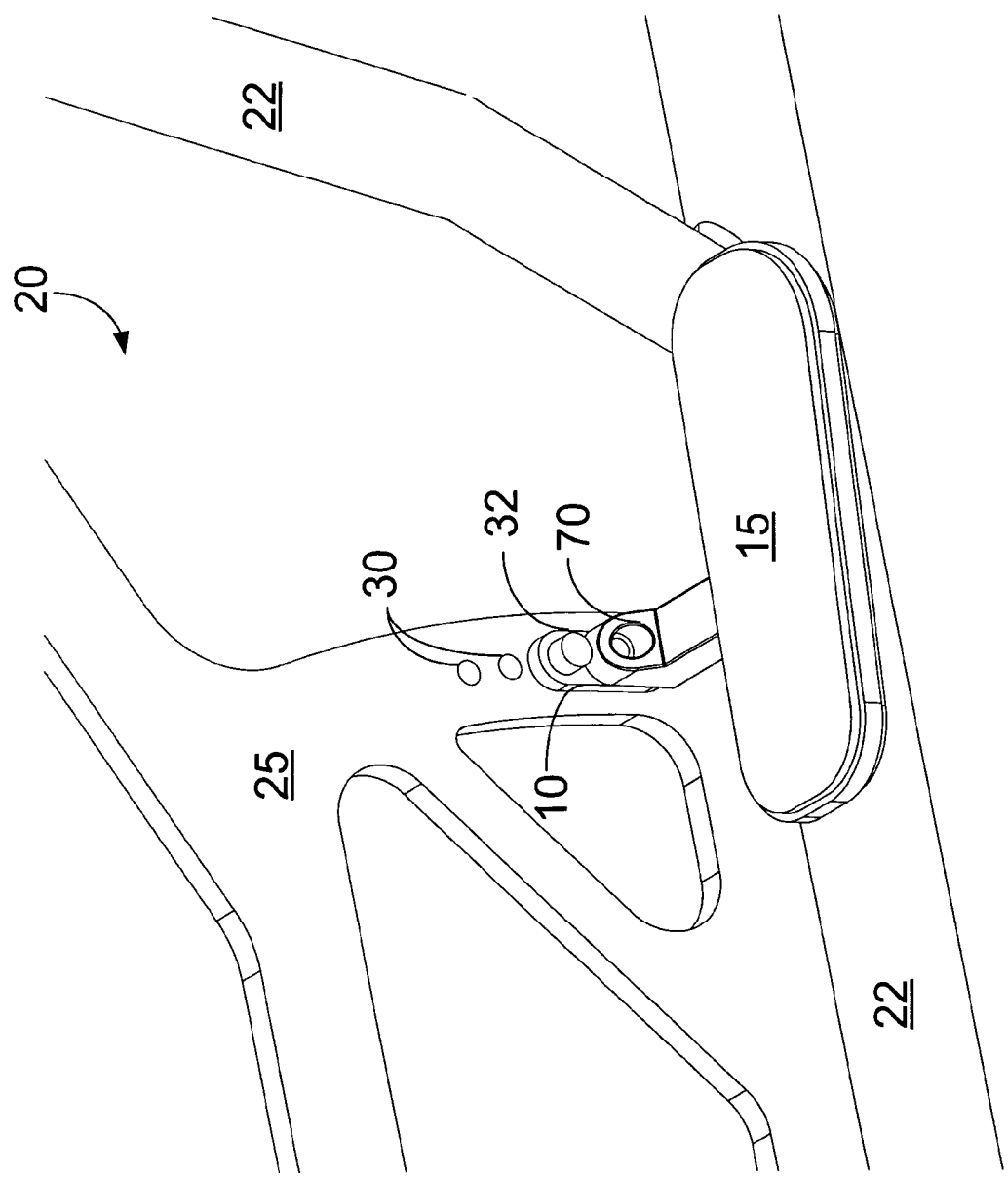
FIG. 7 is an elevation view of the motorcycle floorboard adjuster, the portion of the motorcycle illustrated in FIG. 6, and a motorcycle floorboard in a substantially horizontal position.
Figure 8:
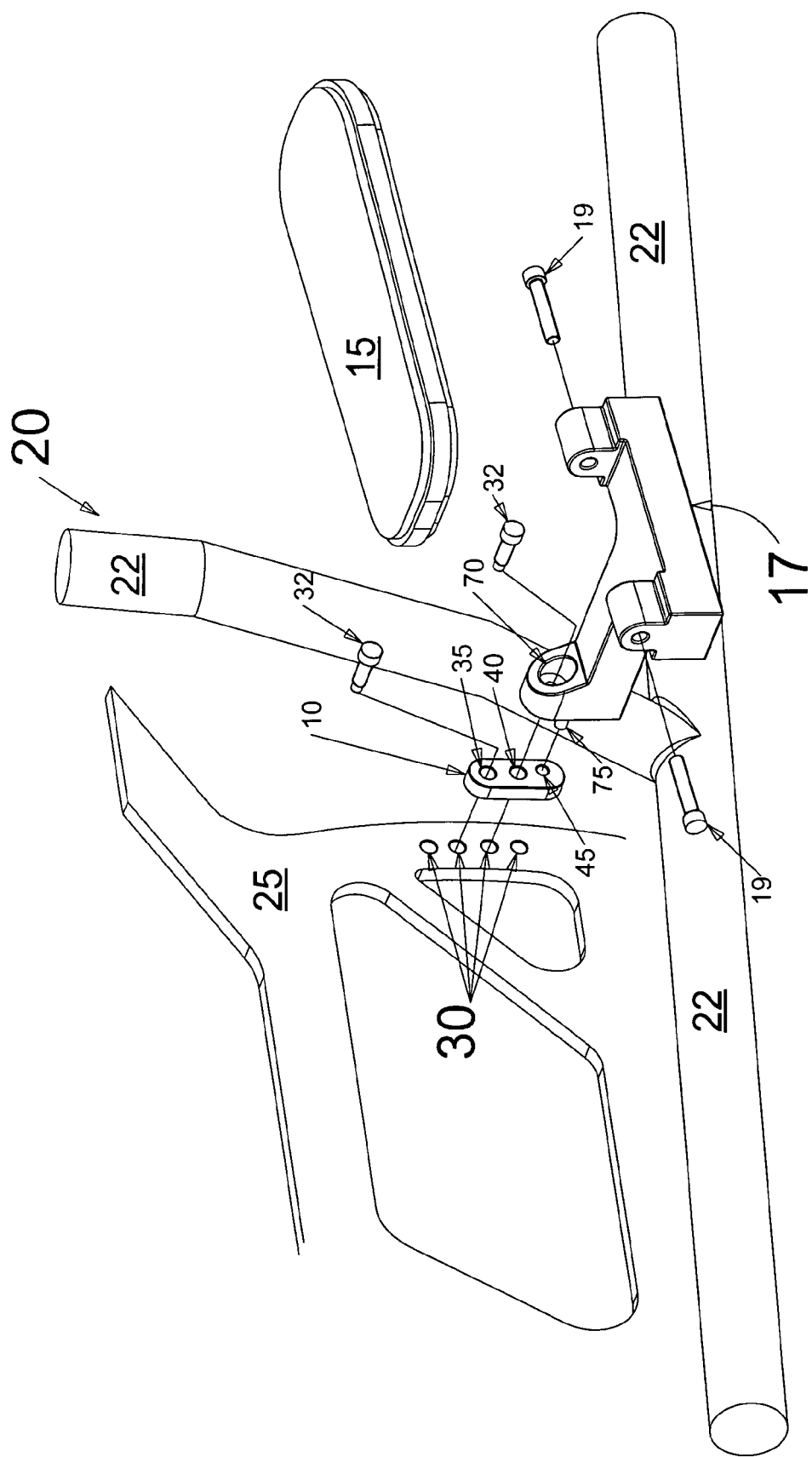
FIG. 8 is an exploded view of the motorcycle floorboard adjuster, the portion of a motorcycle, and the motorcycle floorboard illustrated in FIG. 7.

As shown in FIG. 1, several of the above-listed Harley Davidson models, including the "FL" series, and other Harley Davidson models, may share a common frame 25 that includes several mounting points, or bracket holes, or apertures 30 that are used to attach the rear, or passenger motorcycle floorboards 15 (shown in FIGS. 6-8). It will be appreciated that the bracket holes, or apertures 30 may be included in a bracket that is fastened to the motorcycle frame 25, or the bracket holes 30 may be integral to the motorcycle frame 25, for example, the bracket holes 30 may be located in a metal element that is welded, or otherwise attached to the motorcycle frame 25. As shown in FIG. 8, generally each passenger motorcycle floorboard 15 is rotatably coupled to the motorcycle floorboard bracket 17 by two floorboard bracket fasteners 19 allowing the motorcycle floorboard 15 to be rotated in a "stored" position so that the footrest area is positioned directly adjacent to the motorcycle when a passenger is not present. It will be appreciated that the MFA described herein may also be used with non-rotatable motorcycle floorboards 15.

The limited positions provided by the motorcycle bracket holes 30 limits the size of passengers that can ride comfortably. This is because the motorcycle floorboards, also known as footrests or foot platforms 15, are not suitably positionable for all riders, as the backseat riding position is determined by the rear seat (not shown) and the floorboards 15, and their relative locations.

Unfortunately, the floorboards 15, having limited adjustment, cannot accommodate the range of passengers that exist within the general population. The motorcycle floorboard coupler, or adjuster ("MFA") 10, described herein, provides an apparatus and method that enables adjustment of the position of the floorboard 15 in the vertical position, lateral position, and angular position.

Common complaints among motorcycle passengers are threefold: 1) the motorcycle floorboards 15 are located too high, thereby not providing enough "leg room;" 2) the motorcycle floorboards 15 are substantially parallel to the ground, forcing the foot and ankle into an uncomfortable position; and 3) the motorcycle floorboards 15 are too close to the sides of the motorcycle, forcing the passenger to constantly hold their legs in an "inward" position toward the centerline of the motorcycle, resulting in muscle fatigue and cramping.

Referring now to FIGS. 1-9, the MFA 10 solves the long-felt, but un-resolved need of the above-described problems. For example, the "FL" series of Harley-Davidson motorcycles have been in production since about 1980, and during those 18 years, no device or apparatus has addressed the above-described problems in such a novel, non-obvious, and elegant fashion as the MFA 10.

The MFA 10 provides at least three different vertical positions for the motorcycle floorboard 15, each one closer to the ground plane than the "stock" or originally-manufactured position. That is, the three different vertical positions provided by the motorcycle floorboard 15 increases the "leg room" available to the passenger, allowing the hip and knee joints to be less angled, or straighter, greatly increasing passenger comfort. It will be appreciated that other embodiments of the MFA 10 may provide less, or more vertical positions for the motorcycle floorboard 15.

In addition, one embodiment of the MFA 10 provides the option of positioning the motorcycle floorboard 15 substantially parallel to the ground plane (i.e., in its originally-manufactured orientation), or tilting the rear of the floorboard 15 closer to the ground plane, so that the front of the floorboard 15 is higher, or farther away from the ground plane, as shown in FIG. 6. This tilted angle allows the rear passenger to position his or her feet in a more natural, comfortable position. Also, the MFA 10 provides a motorcycle footrest 15 width, or spacing adjustment, that laterally positions motorcycle footrests 15 farther apart relative to each other than the originally-manufactured lateral position. This also provides a more comfortable riding position for the passenger, allowing the passenger to relax their leg muscles, and thereby eliminating any fatigue.

Finally, the MFA 10 is an elegant design that is inexpensive and easy to manufacture, lightweight, maintenance free, easily installed, and enables quick adjustment to the motorcycle floorboard 15 into a variety of positions.

Referring now to FIG. 1, a right side portion of a motorcycle 20 is illustrated, showing a portion a motorcycle exhaust 22 and a portion of the motorcycle frame 25 that includes several bracket apertures 30 that are used to secure the motorcycle floorboard 15 to the motorcycle 20. It will be appreciated that the left side of the motorcycle frame 25 also includes bracket apertures 30 that are used to secure another motorcycle floorboard 15 to the motorcycle 20. During manufacture of the motorcycle 20, the floorboard 15 (shown in FIGS. 6-7) is bolted, or otherwise fastened to the motorcycle frame 25 using fasteners (not shown) that thread into one or more of the bracket apertures 30.

Figure 2:
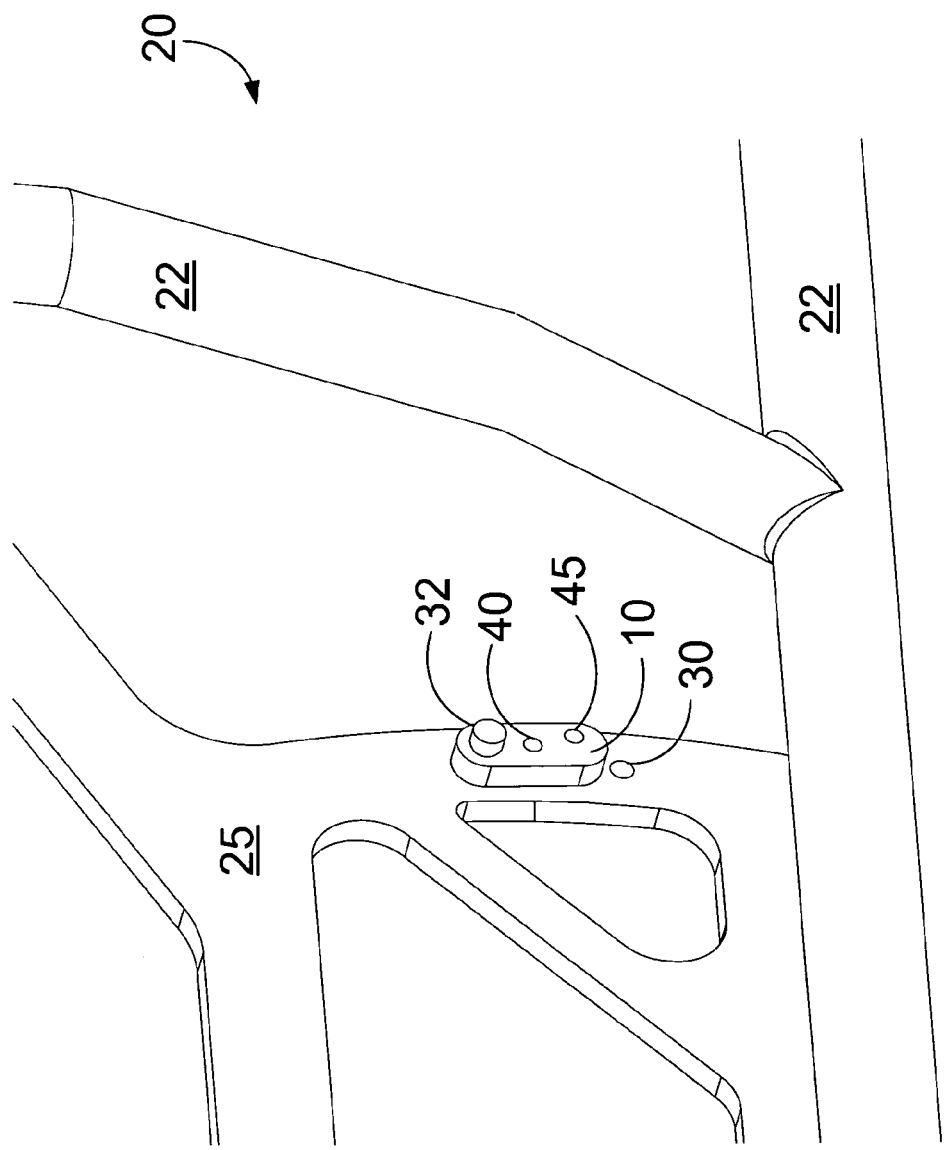
FIG. 2 is an elevation view of the portion of the motorcycle illustrated in FIG. 1, and including one embodiment of a motorcycle floorboard adjuster.
Figure 3:
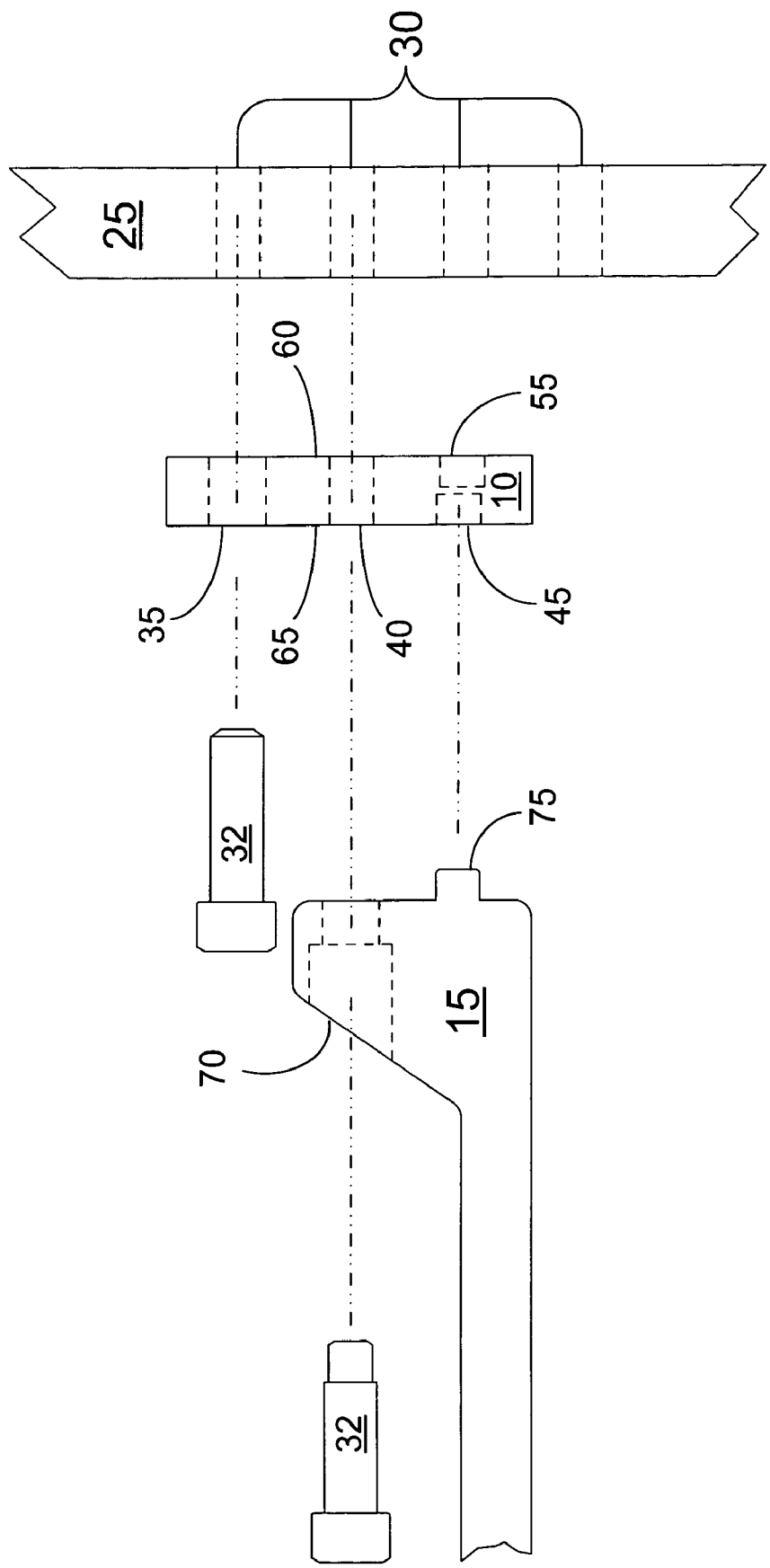
FIG. 3 is an exploded view of a motorcycle floorboard adjuster, a portion of a motorcycle, and a portion of a motorcycle floorboard.

As shown in FIGS. 2 through 5A-B and 8, the MFA 10, is bolted, or otherwise coupled to the motorcycle frame 25 by mounting fastener 32 using the mounting aperture 35 (FIGS. 2-3, and 8). In one embodiment, the MFA 10 includes a floorboard, or foot platform mounting aperture 40 and a first, or offset pin bore 45. As shown in FIGS. 2, 4A and 5A-B, the first pin bore 45 is offset from the MFA longitudinal axis 50. But as shown in FIG. 4B, an opposite side of the MFA 10 includes a second, centered pin bore 55 that is aligned with the MFA longitudinal axis 50. As shown in FIG. 3, both sides of the MFA 10 are substantially flat, or planar, and comprise a mounting surface 60 and a coupling surface 65. The mounting surface 60 removeably attaches to the motorcycle frame 25 and the motorcycle floorboard, or foot platform 15 removeably attaches to the coupling surface 65. Alternatively, the coupling surface 65 may be removeably attached to the motorcycle frame 25 and the motorcycle floorboard 15 is removeably attached to the mounting surface 60.

Figure 5A:
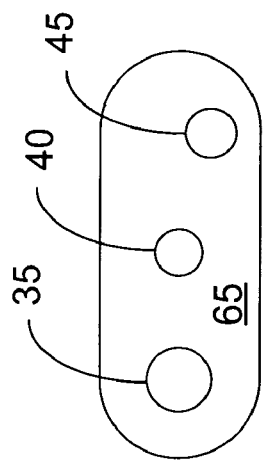
FIGS. 5A-B illustrate a matched set of the embodiment of the motorcycle floorboard adjuster illustrated in FIGS. 2 and 3.
Figure 5B:
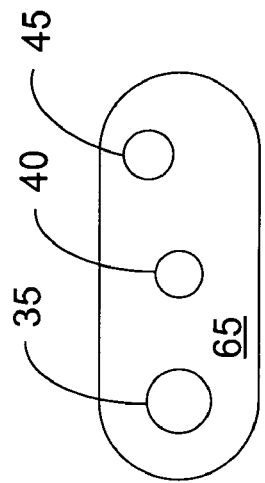

Referring now to FIG. 4A, in one embodiment of the MFA 10, the coupling surface 65 includes the first pin bore 45 that is offset from the MFA longitudinal axis 50. In FIG. 4B, an opposite side of the MFA 10 is illustrated. This side comprises the mounting surface 60 and includes a second pin bore 55 that is aligned with the MFA longitudinal axis 50. As will be discussed in detail below, the mounting surface 60 and the coupling surface 65 are interchangeable, depending on the desired orientation of the motorcycle floorboard 15. Put differently, each side of the MFA 10 (the mounting surface 60 or the coupling surface 65) can be positioned against the motorcycle frame 25. FIG. 5A-B illustrates a matched pair of MFAs 10. The MFA 10 shown in FIG. 5A is designed for attachment to the left side of the motorcycle frame 25, and the MFA 10 shown in FIG. 5B is designed for attachment to the right side of the motorcycle frame 25. Specifically, the offset first pin bores 45 on each MFA 10 shown in FIG. 5A-B allow the passenger to mount the left and right motorcycle floorboards 15 to the motorcycle frame 25 in an angled position, as described in detail below.

Alternatively, each of the MFAs 10 illustrated in FIG. 5A-B may be rotated so that each motorcycle floorboard pin 75 is mounted in the second, or centered pin bore 55, thereby mounting each motorcycle floorboard 15 in a "flat" position that is substantially parallel to the ground plane. In this orientation, the coupling surface 65 is positioned against the motorcycle frame 25, with the motorcycle floorboard 15 positioned against the mounting surface 60 and the motorcycle floorboard pin 75 positioned in the second, or centered, pin bore 55.

Thus, one feature of the MFA 10, is that by simply rotating the MFA 10, the motorcycle floorboards 15 may be quickly, and easily positioned in either a "flat" or angled position. However, it will be appreciated that other embodiments of the MFA 10 may only include one pin bore, 45 or 55. Specifically, one embodiment of the MFA 10 may only include the first, offset pin bore 45 on the coupling surface 65, and not include the second, centered pin bore 55 on the mounting surface 60.

Referring now to FIG. 6, the motorcycle floorboard 15 is angled relative to a horizontal or ground plane 80 defined by a level roadway, or ground upon which the motorcycle travels. This angled position is achieved by first removing the motorcycle floorboard 15 from the motorcycle frame 25, and removeably attaching the MFA 10 to the motorcycle frame 25 by inserting, or threading, a mounting fastener 32 through the mounting aperture 35 and into one of the motorcycle bracket holes 30, as shown in FIG. 3. A distal end of the motorcycle floorboard 15 includes a floorboard, or foot platform aperture 70 through which a mounting fastener 32 is inserted, or threaded. The distal end of the motorcycle floorboard 15 also includes a motorcycle floorboard, or foot platform pin 75, also shown in FIG. 3. The floorboard pin 75 is inserted into the first pin bore 45 that is offset from the MFA longitudinal axis 50, as shown in FIGS. 3 and 4A, 5A-B and 9A. As shown in FIG. 9A, the center of the first pin bore 45 may be offset 0 by about 0.195 of an inch from the MFA longitudinal axis 50, but it will be appreciated that the offset 0 may vary, depending upon the desired angle of motorcycle floorboard 15 relative to a horizontal or ground plane 80 defined by a level roadway, or ground upon which the motorcycle travels.

Referring again to FIGS. 6 and 7, the mounting fastener 32 is then inserted or threaded into the floorboard mounting aperture 40. Because the first pin bore 45 is offset from the MFA longitudinal axis 50, the motorcycle floorboard 15 must be rotated, or angled to enable the floorboard pin 75 to be inserted into the floorboard mounting aperture 45 when the mounting fastener 32 is inserted into the floorboard aperture 70 and then into the floorboard mounting aperture 40 in the MFA 10. In this fashion, the MFA 10 enables an originally-manufactured motorcycle floorboard 15 to be quickly and easily attached to the motorcycle frame 25 at an angled position thereby increasing passenger comfort. In one embodiment the amount of tilt, or angle provided by the MFA 10 is about 15 degrees from the horizontal, as measured from the ground plane 80, but it will be appreciated that angles less than, and more than 15 degrees may be achieved by other embodiments of the MFA 10.

Referring now to FIG. 7, another feature of the MFA 10 is illustrated. As shown in FIG. 1, the motorcycle frame 25 includes four motorcycle bracket holes 30. The originally manufactured (i.e., "stock") motorcycle floorboard 15 is attached to the motorcycle frame 25 by passing a mounting fastener 32 through the floorboard aperture 70 (shown in FIG. 3) and then threading the mounting fastener into one of the three uppermost frame holes 30. As the floorboard 15 is positioned against the motorcycle frame 25, the floorboard pin 75 is positioned in the motorcycle frame hole 30 that is directly below the motorcycle frame hole 30 that receives the mounting fastener 32. Therefore, only three vertical positions are provided by the motorcycle manufacturer, as the fourth, or bottom frame hole 30 is used to receive the floorboard pin 75. The floorboard pin 75 needs to be secured in one of the frame holes 30, as it provides a second mounting point for the motorcycle floorboard 15, thereby preventing the floorboard 15 from rotating (as would be the case if the floorboard 15 was only attached to the motorcycle frame 25 at one point).

As shown in FIGS. 3 and 7, the MFA 10 provides three different vertical mounting positions on the motorcycle frame 25, as the MFA 10 can be installed in any of the three motorcycle bracket holes 30, but positions the motorcycle floorboard 15 lower, or closer to the ground plane, than the corresponding "stock" position. For example, as shown in FIGS. 3 and 7, the MFA 10 can be removeably attached to the third bracket hole 30 by inserting mounting fastener 32 through mounting aperture 35 and then threading the mounting fastener 32 into the third bracket hole 30. A second mounting fastener 32 is then inserted through the floorboard aperture 70 and into the fourth bracket hole 30 while the floorboard 15 is positioned against the MFA 10 with the floorboard pin 75 inserted into the first or second pin bores 45, 55 (depending on whether an angled, or "flat" floorboard 15 orientation is desired). By positioning the motorcycle floorboard 15 lower, or closer to the ground plane than any "stock" position, the MFA 10 increases the "leg room" for the rear passenger by allowing the hip and knee joints of the passenger to be more extended.

Referring now to FIGS. 3 and 9B-C, another feature of the MFA 10 is illustrated. By mounting the MFA 10 between the motorcycle frame 25 and the motorcycle floorboard 15, the motorcycle floorboard 15 is located farther away from the motorcycle frame 25. In one embodiment, the MFA 10 may have a thickness T of 0.5 of an inch (as shown in FIG. 9C), or in other embodiments the MFA 10 may have a thickness T of greater than, or less than 0.5 of an inch. When installed on both sides of the motorcycle, the MFA 10, in the 0.5 inch embodiment, increases the lateral spacing between both motorcycle floorboards 15 by 1.0 inch. This increased lateral spacing allows the passenger to relax their leg muscles as now the floorboards 15 are farther apart, thereby eliminating muscle fatigue. As shown in FIG. 9B, the MFA 10 may have a width W of about 1 inch, but it will be appreciated that this dimension may vary as desired.

Embodiments of a motorcycle floorboard adjuster (MFA) are disclosed above. One embodiment of a MFA comprises a coupler for removeably attaching a motorcycle foot platform to a motorcycle comprising a mounting surface having a substantially flat face that is positionable directly adjacent to the motorcycle, and a coupling surface located opposite the mounting surface, the coupling surface comprising a substantially flat face. A first pin bore opening is located on the coupling surface, the first pin bore offset from a longitudinal axis of the coupler, and is sized to receive a motorcycle foot platform pin. A second pin bore opening is located on the mounting surface, the second pin bore substantially aligned with the longitudinal axis of the coupler, and is sized to receive the motorcycle foot platform pin. A mounting aperture extends through the coupler, the mounting aperture sized to receive a fastener that removeably attaches the coupler to the motorcycle. A foot platform aperture extends through the coupler, the foot platform aperture located between the mounting aperture and both pin bores, and is sized to receive a fastener that removeably attaches the motorcycle foot platform to the coupler.

In one embodiment, the mounting surface and the coupling surface are interchangeable so that either surface may be positioned directly adjacent to the motorcycle. When the motorcycle foot platform pin is located in the first pin bore the motorcycle foot platform is angled relative to a horizontal or ground plane and when the motorcycle foot platform pin is located in the second pin bore the motorcycle foot platform is level relative to the ground plane. The MFA may comprise a thickness as measured between the mounting surface and the coupling surface that may range between 0.5 and 2.0 of an inch. The mounting aperture may comprise a threaded bore, the coupling aperture may comprise a smooth bore and the first and second pin bores may not extend though the coupler.

One method for adjusting a position of a motorcycle foot platform relative to a motorcycle by using the MFA disclosed above comprises the steps of: a) removing a motorcycle floorboard; b) removeably attaching a coupler (the MFA) to the motorcycle by inserting a first fastener through a first aperture in the coupler and threading the first fastener into the motorcycle; c) positioning the motorcycle floorboard against the coupler by inserting a motorcycle floorboard pin into a first pin bore located below a second aperture; and d) removeably attaching the motorcycle floorboard to the coupler by threading a second fastener into the second aperture located below the first aperture and above the first pin bore. It will be appreciated that steps b, c and d may be performed in any order and that steps a, b, c and d are repeated on an opposite side of the motorcycle to attach a second motorcycle floorboard.

During installation, the method may also include the steps of: e) determining a desired position of the motorcycle floorboard, the desired position either angled or substantially parallel relative to a ground plane; f) performing steps a through d when the desired position of the motorcycle floorboard is angled relative to the ground plane; and g) rotating the coupler and performing steps a through d with the exception of using a second pin bore instead of the first pin bore when the desired position of the motorcycle floorboard is substantially parallel relative to the ground plane. The second pin bore is located on a second side of the coupler, and the first pin bore is located on a first side of the coupler.

Another embodiment of the MFA disclosed above may also comprise a coupler for removeably attaching a motorcycle foot platform to a motorcycle comprising a mounting surface that is positionable directly adjacent to the motorcycle and a coupling surface located opposite the mounting surface. A first pin bore is located in the coupling surface, the first pin bore offset from a longitudinal axis of the coupler, the first pin bore sized to receive a motorcycle foot platform pin. A mounting aperture extends through the coupler, the mounting aperture sized to receive a fastener that removeably couples the coupler to the motorcycle. A foot platform aperture extends through the coupler, the foot platform aperture located between the mounting aperture and the pin bore, and sized to receive a fastener that removeably couples the motorcycle foot platform to the coupler. A second pin bore is located on the mounting surface, the second pin bore substantially aligned with the longitudinal axis of the coupler, and sized to receive the motorcycle foot platform pin. The motorcycle foot platform is level relative to a horizontal plane when the motorcycle foot platform pin is located in the second pin bore and the coupling surface is positioned directly adjacent to the motorcycle. The motorcycle foot platform is angled relative to a horizontal plane when the motorcycle foot platform pin is located in the first pin bore. The mounting surface and the coupling surface are interchangeable so that either surface may be positioned directly adjacent to the motorcycle. The coupler comprises a substantially rectangular shape where the mounting surface and the coupling surface each comprise a substantially flat face, with both surfaces substantially parallel to each other, and each face terminating at two rounded ends, and the first and second pin bores do not extend though the coupler.

For the purposes of interpreting words used in the claims, it is to be noticed that the term "comprising", should not be interpreted as being limitative to the claim elements listed thereafter. Thus, the scope of the expression "a device comprising elements A and B" should not be limited to devices consisting only of components A and B. It means that with respect to the MFA, the only relevant components of the device are A and B.

Similarly, it is to be noticed that the term "coupled", also used in the claims, should not be interpreted as meaning attached or joined together, but not limitative to direct connections only. Thus, the scope of the expression "an element A coupled to an element B" should not be limited to devices or systems wherein element A is directly connected to element B. It means that there exists a path between A and B which may be a path including other elements or means. In addition, when element A is "coupled" to element B, relative motion may be allowed between element A and element B.

Thus, it is seen that a motorcycle floorboard adjuster (MFA) is provided. One skilled in the art will appreciate that the MFA can be practiced by other than the above-described embodiments, which are presented in this description for purposes of illustration and not of limitation. The specification and drawings included herein are not intended to limit the exclusionary scope of this patent document. It is noted that various equivalents for the particular embodiments discussed in this description may practice the invention as well. That is, while the MFA has been described in conjunction with specific embodiments, it is evident that many alternatives, modifications, permutations and variations will become apparent to those of ordinary skill in the art in light of the foregoing description. Accordingly, it is intended that the MFA shall embrace all such alternatives, modifications and variations as fall within the scope of the appended claims. The fact that a product or method exhibits differences from one or more of the above-described exemplary embodiments does not mean that the product or method is outside the scope (literal scope and/or other legally-recognized scope) of the following claims.

What is claimed is:

1. A motorcycle foot platform bracket for a motorcycle, comprising:
    a mounting surface comprising a substantially flat face that is positionable directly adjacent to the motorcycle;
    a coupling surface located opposite the mounting surface, the coupling surface comprising a substantially flat face and sized to receive a motorcycle foot platform;
    a first pin bore that does not extend through the motorcycle foot platform bracket, located on the coupling surface, the first pin bore offset from a longitudinal axis of the motorcycle foot platform bracket, and sized to receive a motorcycle foot platform pin so that the motorcycle foot platform is angled relative to a ground plane;
    a second pin bore opening located on the mounting surface, the second pin bore substantially aligned with the longitudinal axis of the motorcycle foot platform bracket, and sized to receive the motorcycle foot platform pin;
    a mounting aperture comprising a threaded bore extending through the motorcycle foot platform bracket, the mounting aperture sized to receive a fastener that removeably attaches the motorcycle foot platform bracket to the motorcycle; and
    a foot platform aperture extending through the motorcycle foot platform bracket, the foot platform aperture located between the mounting aperture and both pin bores, and sized to receive a fastener that removeably attaches the motorcycle foot platform to the motorcycle foot platform bracket so that the motorcycle foot platform is positioned away from the motorcycle.

2. The motorcycle foot platform bracket of claim 1, where the mounting surface and the coupling surface are interchangeable so that either surface may be positioned directly adjacent to the motorcycle.

3. The motorcycle foot platform bracket of claim 1, where the motorcycle foot platform is angled relative to a ground plane when the motorcycle foot platform pin is located in the first pin bore.

4. The motorcycle foot platform bracket of claim 1, where the motorcycle foot platform is substantially parallel relative to a ground plane when the motorcycle foot platform pin is located in the second pin bore and the coupling surface is positioned directly adjacent to the motorcycle.

5. The motorcycle foot platform bracket of claim 1, where the motorcycle foot platform bracket includes a thickness as measured between the mounting surface and the coupling surface that ranges between 0.5 and 2.0 of an inch.

6. The motorcycle foot platform bracket of claim 1, where the coupling aperture comprises a smooth bore.

7. The motorcycle foot platform bracket of claim 1, where each of the first and second pin bores do not extend though the motorcycle foot platform bracket.

8. A motorcycle foot platform bracket for a motorcycle, comprising:
    a mounting surface that is positionable directly adjacent to the motorcycle;
    a coupling surface located opposite the mounting surface sized to receive a motorcycle foot platform;
    a first pin bore that does not extend through the motorcycle foot platform bracket, located in the coupling surface, the first pin bore offset from a longitudinal axis of the motorcycle foot platform bracket, the first pin bore sized to receive a motorcycle foot platform pin so that the motorcycle foot platform is angled relative to a ground plane;
    a mounting aperture comprising a threaded bore extending through the motorcycle foot platform bracket, the mounting aperture sized to receive a fastener that removeably couples the motorcycle foot platform bracket to the motorcycle; and
    a foot platform aperture extending through the motorcycle foot platform bracket, the foot platform aperture located between the mounting aperture and the pin bore, and sized to receive a fastener that removeably couples the motorcycle foot platform to the motorcycle foot platform bracket and the motorcycle so that the motorcycle foot platform is positioned away from the motorcycle.

9. The motorcycle foot platform bracket of claim 8, further comprising a second pin bore located on the mounting surface, the second pin bore substantially aligned with the longitudinal axis of the motorcycle foot platform bracket, and sized to receive the motorcycle foot platform pin.

10. The motorcycle foot platform bracket of claim 9, where the motorcycle foot platform is level relative to a horizontal plane when the motorcycle foot platform pin is located in the second pin bore and the coupling surface is positioned directly adjacent to the motorcycle.

11. The motorcycle foot platform bracket of claim 8, where the motorcycle foot platform is angled relative to a horizontal plane when the motorcycle foot platform pin is located in the first pin bore.

12. The motorcycle foot platform bracket of claim 8, where the mounting surface and the coupling surface are interchangeable so that either surface may be positioned directly adjacent to the motorcycle.

13. The motorcycle foot platform bracket of claim 8, where the motorcycle foot platform bracket comprises a substantially rectangular shape where the mounting surface and the coupling surface each comprise a substantially flat face, with both surfaces substantially parallel to each other, and each face terminating at two rounded ends.

14. The motorcycle foot platform bracket of claim 9, where each of the first and second pin bores do not extend though the motorcycle foot platform bracket.

* * * * *